(12) United States Patent     (10) Patent No.:   US 12,608,452 B2

Sarda                       (45) Date of Patent:     Apr. 21, 2026

(54) METHOD FOR TRACKING THE PROCESSING OF A DIGITAL ASSET, METHOD FOR IDENTIFYING SUCH PROCESSING, CORRESPONDING COMPUTER PROGRAM PRODUCTS AND DEVICES

(71) Applicant: NAGRAVISION Sàrl, Cheseaux-sur-Lausanne (CH)

(72) Inventor: Pierre Sarda, Cheseaux-sur-Lausanne (CH)

(73) Assignee: NAGRAVISION Sàrl, Cheseaux-sur-Lausanne (CH)

( * ) Notice: Subject to any disclaimer, the term of this patent is extended or adjusted under 35 U.S.C. 154(b) by 22 days.

(21) Appl. No.: 18/744,773

(22) Filed: Jun. 17, 2024

(65) Prior Publication Data

US 2024/0427854 A1     Dec. 26, 2024

(30) Foreign Application Priority Data

Jun. 23, 2023    (EP) ..................................... 23181279

(51) Int. Cl.
*G06F 21/16*       (2013.01)
*G06F 21/60*       (2013.01)

(52) U.S. Cl.
CPC ............ *G06F 21/16* (2013.01); *G06F 21/602* (2013.01)

(58) Field of Classification Search
CPC .... G06F 21/16; G06F 21/602; G06F 21/1063; G06F 21/1078; G06F 21/64; H04L 9/50; H04N 21/278; H04N 21/8352; H04N 21/8358
See application file for complete search history.

(56) References Cited

U.S. PATENT DOCUMENTS

2008/0240490 A1\*   10/2008   Finkelstein .......... H04N 21/235
                                           382/100
2018/0121635 A1     5/2018   Tormasov et al.
2021/0233204 A1\*   7/2021   Alattar .................. G10L 19/018
2023/0205849 A1\*   6/2023   Jackson .................. G06F 21/10
                                           726/26

OTHER PUBLICATIONS

European Search Report issued Dec. 8, 2023 in European Application 23181279.3 filed on Jun. 23, 2023, 8 pages (with Written Opinion).
Bhadauria et al., "Intellectual Property Protection using Blockchain and Digital Watermarking", 2021 IEEE International Conference on Advanced Networks and Telecommunications, 2021, 6 pages, XP034223722.

\* cited by examiner

*Primary Examiner* — Sangseok Park

(74) *Attorney, Agent, or Firm* — Oblon, McClelland, Maier & Neustadt, L.L.P.

(57)             ABSTRACT

A method for tracking the processing of an initial digital asset according to at least one processing step delivering an output digital asset from an input digital asset that is a function of the initial digital asset. The method includes watermarking the output digital asset with a watermark, representative of an identifier of the output digital asset; and creating, in a blockchain, metadata associated with the output digital asset, the metadata being associated with the identifier.

15 Claims, 3 Drawing Sheets

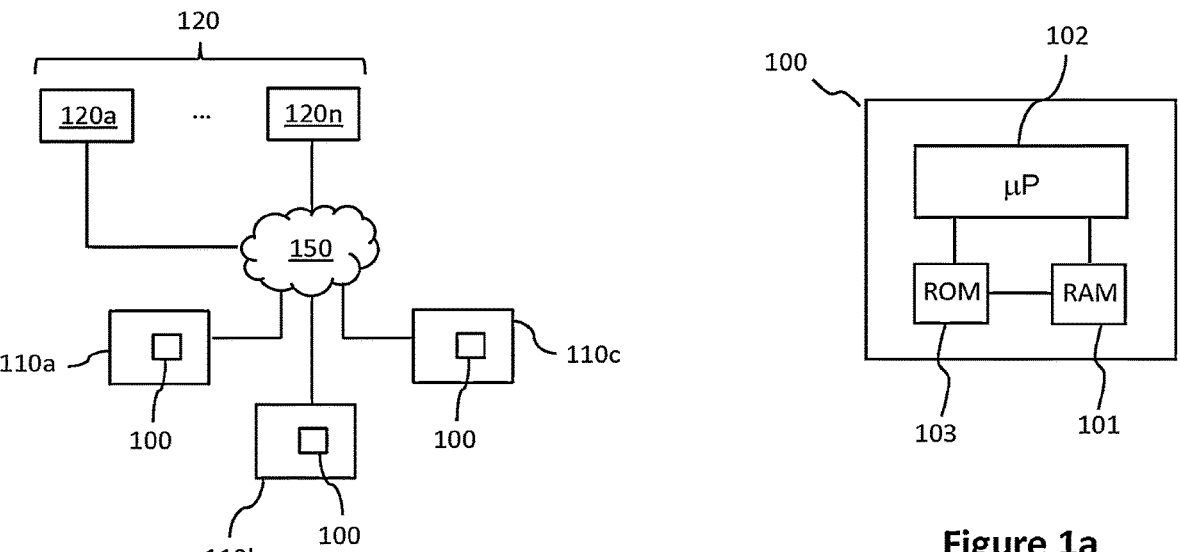
Figure 1
Figure 1a
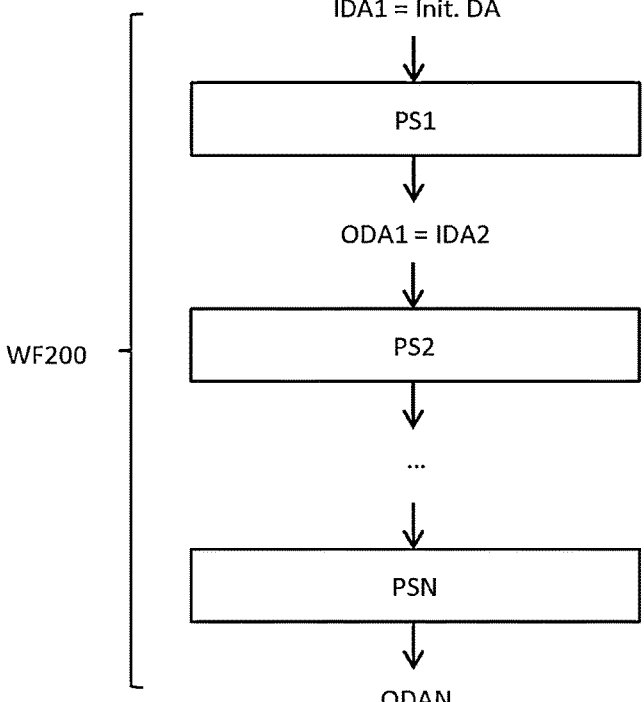
Figure 2

METHOD FOR TRACKING THE PROCESSING OF A DIGITAL ASSET, METHOD FOR IDENTIFYING SUCH PROCESSING, CORRESPONDING COMPUTER PROGRAM PRODUCTS AND DEVICES

1. FIELD OF THE DISCLOSURE

The field of the disclosure is that of the processing of digital assets (or digital contents).

More specifically, the disclosure relates to a technology for tracking and identifying the processing of such digital assets.

The disclosure can be of interest in any field wherein digital assets have to be processed. This may be the case for instance in industries producing such digital assets, e.g. for the production of audiovisual contents.

2. TECHNOLOGICAL BACKGROUND

A digital asset can represent considerable value, depending on its usage and/or its unicity. Examples of such digital assets are digital images, videos, sounds, and any digital asset that can be sensed by a human with the appropriate rendering mechanism. Images and sounds are the most common digital assets that can be sensed by humans.

The production of digital assets can involve different parties, e.g. with subcontractors. For instance, the production of an audio-visual content, e.g. a movie, can involve, on one hand, the studios and producers and, on the other hand, different post-production companies (i.e. processors) that process the content according to the contract with studios and producers. Furthermore, new generative artificial intelligence and massive content derivative are more and more present, proposing content repurposing. It thus may be difficult to have the knowledge of the way a given digital access has been created.

There is thus a need for a method that allows tracking and identifying the processing that has been applied to a given digital asset.

3. SUMMARY

A particular aspect of the present disclosure relates to a method for tracking the processing of an initial digital asset according to at least one processing step delivering an output digital asset from at least one input digital asset which is a function of the initial digital asset. Such method for tracking the processing of an initial digital asset comprises, for at least one given processing step among the at least one processing step, the given processing step delivering a given output digital asset from at least one given input digital asset which is a function of the initial digital asset, the acts of:

watermarking the given output digital asset with a watermark, hereafter output watermark, representative of an identifier, hereafter output identifier, of the output digital asset;

creating, in a blockchain, metadata, hereafter output metadata, associated to the given output digital asset, the output metadata being associated to the output identifier.

Thus, the present disclosure proposes a new and inventive solution for tracking and identifying the processing that has been applied to a given digital asset (e.g. an image, a video or a sound).

More particularly, the proposed solution relies on the use of watermarking (according to any know technics) for uniquely associating an identifier to a digital asset. Such identifier is further associated to metadata securely stored in a blockchain. The metadata comprises e.g. information relating to the processing experienced by the digital asset, thus allowing the tracking of such processing experienced by the digital asset.

In some embodiments, the given processing step comprises, for at least one given input digital asset, an action belonging to the group comprising: editing the given input digital asset; adding special effects to the given input digital asset; recasting the given input digital asset; encoding the given input digital asset and an AI based generation of the output digital asset.

In some embodiments, the method for tracking the processing of an initial digital asset comprises, for at least one given input digital asset, the acts of:

decoding a watermark, hereafter input watermark, of the given input digital asset delivering an identifier, hereafter input identifier, of the given input digital asset, metadata, hereafter input metadata, being associated to the input digital asset in the blockchain, the input metadata being associated to the input identifier;

retrieving, from the blockchain, the input metadata associated to the input identifier; and, only if the input metadata comprise suppression information allowing the suppression of the input watermark:

suppressing the input watermark from the given input digital asset delivering an updated input digital asset.

The given processing step delivers the given output digital asset from the updated input digital asset in place of the given input digital asset.

Thus, only the output watermark is present in the output digital asset. For instance, the suppression information comprises reference to the technic used for creating the input watermark, thus allowing the device obtaining the suppression information to determine a technic to be used for suppressing the input watermark. Alternatively, the suppression information directly comprises reference to the technic to be used for the suppression of the input watermark.

In some embodiments, the method for tracking the processing of an initial digital asset comprises the act of:

obtaining additional information representative of a right or not to suppress the input watermark.

The suppressing the input watermark is executed only if the input metadata comprise information allowing the suppression of the input watermark and if the additional information is representative of a right to suppress the input watermark.

Thus, the right to perform the suppression of the input watermark is controlled.

In some embodiments, the obtaining additional information comprises populating the additional information into the device executing the conditional act of suppressing the input watermark.

In some embodiments, the obtaining additional information comprises receiving, by the device executing the conditional act of suppressing the input watermark, the additional information sent by a right management server communicatively connected to the device.

In some embodiments, the retrieving, from the blockchain, the input metadata implements an access right management technic for allowing the blockchain to provide the input metadata to the device executing the act of retrieving the input metadata.

Thus, the right to retrieve the input metadata is controlled through the implementation of the access right management technic (e.g. use of credentials, of a DRM technic, of a certificate, etc.).

In some embodiments, the output metadata created in the blockchain comprises the input identifier.

Thus, the metadata associated to a given digital asset allows identifying all or part of the input digital assets used for creating the given digital asset and thus accessing to the corresponding input metadata in the blockchain.

In some embodiments, the at least one processing step comprises a plurality of processing steps ordered as a sequence of processing steps delivering each an output digital asset from at least one input digital asset which is a function of the initial digital asset. The output digital asset delivered by a processing step of given rank in the sequence is one of the at least one input digital asset of a processing step of next rank in the sequence. The acts of the method for tracking the processing of an initial digital asset are executed for each processing step of the sequence.

For instance, a workflow schedules the plurality of processing steps.

Another aspect of the present disclosure relates to a method for identifying the processing of an initial digital asset according to at least one processing step delivering an output digital asset from at least one input digital asset which is a function of the initial digital asset. Such method for identifying the processing of an initial digital asset comprises, for at least one given output digital asset delivered by a given processing step among the at least one processing step, the given processing step delivering the given output digital asset from at least one given input digital asset which is a function of the initial digital asset, the acts of:

decoding a watermark, hereafter output watermark, of the given output digital asset delivering an identifier, hereafter output identifier, of the given output digital asset; and retrieving, from a blockchain, metadata, hereafter output metadata, associated to the given output digital asset, the output metadata being associated to the output identifier.

Thus, the information relating to the processing implemented for achieving the output digital asset can easily be retrieved by decoding the watermark of the considered digital asset and retrieving the corresponding metadata from the blockchain.

In some embodiments, the output metadata comprises at least one identifier, hereafter input identifier, of a given input digital asset among the at least one given input digital asset. Metadata, hereafter input metadata, is associated to the given input digital asset in the blockchain, the input metadata being associated to the input identifier.

In some embodiments, the method for identifying the processing of an initial digital asset comprises, for the at least one input identifier, the act of:

retrieving, from the blockchain, the input metadata associated to the input identifier.

Thus, the electronic device executing the method has the knowledge of the metadata associated to the input digital assets used for achieving a given digital asset.

In some embodiments, the retrieving, from the blockchain, the input metadata implements an access right management technic for allowing the blockchain to provide the input metadata to the device executing the act of retrieving the input metadata.

In some embodiments, the output metadata comprises a plurality of input identifiers. The method for identifying the processing of an initial digital asset comprises, for each input identifier of the plurality of input identifiers, the act of retrieving, from the blockchain, the input metadata associated to the input identifier.

In some embodiments, the input metadata comprises information about the processing implemented for obtaining the given input digital asset as a function of the initial digital asset.

In some embodiments, the output metadata comprises information about the processing implemented during the given processing step for delivering the given output digital asset from the at least one given input digital asset.

For instance, the output metadata comprises information about the nature of the processing implemented for achieving the given output digital asset, the person in charge of such processing, the organization in charge of such processing.

In some embodiments, the metadata is stored in a respective NFT in the blockchain.

Another aspect of the present disclosure relates to a computer program product comprising program code instructions for implementing the above-mentioned method for tracking the processing of an initial digital asset (in any of the different embodiments discussed above), when the program is executed on a computer or a processor.

Another aspect of the present disclosure relates to a computer program product comprising program code instructions for implementing the above-mentioned method for identifying the processing of an initial digital asset (in any of the different embodiments discussed above), when the program is executed on a computer or a processor.

Another aspect of the present disclosure relates to an electronic device configured for implementing all or part of the steps of the above-mentioned method for tracking the processing of an initial digital asset (in any of the different embodiments discussed above). Thus, the features and advantages of this device are the same as those of the corresponding steps of said method. Therefore, they are not detailed any further.

Another aspect of the present disclosure relates to an electronic device configured for implementing all or part of the steps of the above-mentioned method for identifying the processing of an initial digital asset (in any of the different embodiments discussed above). Thus, the features and advantages of this device are the same as those of the corresponding steps of said method. Therefore, they are not detailed any further.

4. LIST OF FIGURES

Other features and advantages of embodiments shall appear from the following description, given by way of indicative and non-exhaustive examples and from the appended drawings, of which:

FIG. 1 illustrates first servers that implement processing steps to be applied to an initial digital asset and that are communicatively connected to second servers implementing a blockchain according to one embodiment of the present disclosure;

FIG. 1a illustrates an example of the structural blocks of an electronic device allowing all or part of the steps of the method for tracking the processing of an initial digital asset of FIG. 3 and of FIG. 3a, and/or all or part of the steps of the method for identifying the processing of an initial digital asset of FIG. 4, to be executed according to one embodiment of the present disclosure;

FIG. 2 illustrates a workflow identifying processing steps to be applied to an initial digital asset by the processing servers of FIG. 1 according to one embodiment of the present disclosure;

5. DETAILED DESCRIPTION

Figure 3:
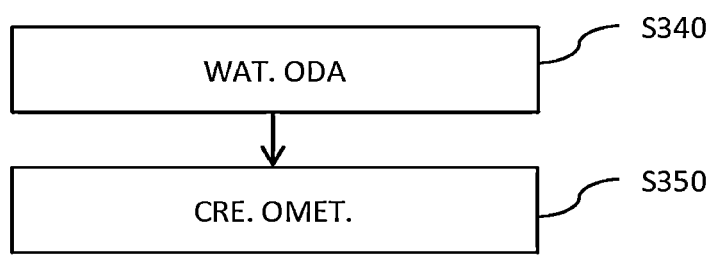
FIG. 3 illustrates the steps of a method for tracking the processing of an initial digital asset according to one embodiment of the present disclosure.

In all of the Figures of the present document, the same numerical reference signs designate similar elements and steps.

Referring now to FIG. 1, we describe first servers 110a, 110b, 110c implementing processing steps to be applied to an initial digital asset (i.e. an asset comprising e.g. digital images, videos, sounds and/or any digital asset that can be sensed by a human with the appropriate rendering mechanism) communicatively connected to second servers 120a, 120b, . . . , 120n implementing a blockchain 120 according to one embodiment of the present disclosure.

More particularly, the first servers 110a, 110b, 110c are communicatively connected to the second servers 120a, 120b, . . . , 120n through a wired communications link that goes through a core network 150. Such wired communications link is e.g. a xDSL communications link and implements e.g. an internet protocol. However, in some embodiments, the communications link between the first servers 110a, 110b, 110c and the second servers 120a, 120b, . . . , 120n goes through a wireless communications link, e.g. based on a cellular protocol (e.g. a 3GPP 2G, 3G, 4G or 5G protocol) or on a WiMAX protocol.

Back to FIG. 1, the first servers 110a, 110b, 110c implement processing steps to be applied to an initial digital asset. More particularly, a given processing step delivers an output digital asset from one (or more) input digital asset which is a function of the initial digital asset. For instance, such processing step comprises an action such as: rescaling an input digital asset, formatting an input digital asset, colorizing an input digital asset, subtitling an input digital asset, editing an input digital asset, adding special effects to an input digital asset, encoding an input digital asset, an AI based generation of the output digital asset from the one (or more) input digital asset, etc.

In order to track the processing performed by the first servers 110a, 110b, 110c and/or identify such processing, the first servers 110a, 110b, 110c implement an electronic device 100 that comprises means allowing all or part of the steps of the method for tracking the processing of an initial digital asset of FIG. 3 and of FIG. 3a (in the various embodiments disclosed below in relationship with FIG. 3 and FIG. 3a), and/or all or part of the steps of the method for identifying the processing of an initial digital asset of FIG. 4 (in the various embodiments disclosed below in relationship with FIG. 4), to be executed. More particularly, in some embodiments the electronic device 100 comprises (FIG. 1a):

a non-volatile memory 103 (e.g. a read-only memory (ROM), a hard disk, a flash memory, etc.);

a volatile memory 101 (e.g. a random-access memory or RAM) and a processor 102.

The non-volatile memory 103 is a non-transitory computer-readable carrier medium. It stores executable program code instructions, which are executed by the processor 102 in order to enable implementation of all or part of the steps of the methods described below (method for tracking the processing of an initial digital asset of FIG. 3 and of FIG. 3a (in the various embodiments disclosed below in relationship with FIG. 3 and FIG. 3a), and/or of all or part of the method for identifying the processing of an initial digital asset of FIG. 4 (in the various embodiments disclosed below in relationship with FIG. 4)).

Upon initialization, the aforementioned program code instructions are transferred from the non-volatile memory 103 to the volatile memory 101 so as to be executed by the processor 102. The volatile memory 101 likewise includes registers for storing the variables and parameters required for this execution.

The steps of the method for tracking the processing of an initial digital asset or of the method for identifying the processing of an initial digital asset may be implemented equally well:

by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a CD-ROM, a DVD-ROM, a USB key) or non-detachable; or by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it may also be implemented in hardware form or any form combining a hardware portion and a software portion.

In the present embodiment, the electronic device 100 is implemented in the first servers 110a, 110b, 110c that execute the processing steps. However, in other embodiments, such electronic device 100 is also (or exclusively) implemented in one (or more) external server that performs all or part of the steps of the method for tracking the processing of an initial digital asset of FIG. 3 and of FIG. 3a, and/or of the steps of the method for identifying the processing of an initial digital asset of FIG. 4. For instance, the first servers 110a, 110b, 110c that implement the processing steps delegate the execution of the method for tracking the processing of an initial digital asset of FIG. 3 and of FIG. 3a, and/or of the method for identifying the processing of an initial digital asset of FIG. 4, to such external server(s). For instance, the external servers are the second servers 120a, 120b, . . . , 120n implementing the blockchain 120.

As detailed below in relationship with FIG. 3, FIG. 3a and FIG. 4, the present methods rely on the use of watermarking (according to any know technics) for uniquely associating an identifier to a digital asset that is watermarked. Such identifier is further associated to metadata securely stored in the blockchain 120. The metadata comprise e.g. information relating to the processing experienced by the digital asset, thus allowing the tracking of such processing experienced by the digital asset. In some implementations, all or part of the metadata registered in the blockchain 120 can be managed by the first servers 110a, 110b, 110c.

In some embodiments, there is only one first server 110a involved in the processing of the initial digital asset. In this case, the first server 110a may implement a single processing step or a plurality of processing steps. Whatever the number of first servers 110a, 110b, 110c involved the processing of the initial digital asset, when a plurality of processing steps has to be applied to the initial digital asset, those processing steps may be scheduled through a workflow WF200 as described below in relation with FIG. 2.

More particularly, referring now to FIG. 2, we describe a workflow WF200 identifying a plurality of N processing steps PS1, PS2, . . . , PSN to be applied to an initial digital asset by the first servers 110a, 110b, 110c according to one embodiment of the present disclosure.

The workflow WF200 schedules the different processing steps PS1, PS2, . . . , PSN as follows:

the first processing step PS1 delivers a first output digital asset ODA1 from a first input digital asset IDA1 which is the initial digital asset to be processed. However, in other embodiments, the first processing step PS1 delivers the first output digital asset ODA1 from a plurality of first input digital assets IDA1. One of the first input digital assets IDA1 is the initial digital asset. All or part of the remaining first input digital assets IDA1 may also be a function of the initial digital asset;

back to FIG. 2, the second processing step PS2 delivers a second output digital asset ODA2 from a second input digital asset IDA2 which is the first output digital asset ODA1. However, in other embodiments, the second processing step PS2 delivers the second output digital asset ODA2 from a plurality of second input digital assets IDA2. One of the second input digital assets IDA2 is the first output digital assets ODA1, which is a function of the initial digital asset. All or part of the remaining second input digital assets IDA2 may also be a function of the initial digital asset;

This chaining of successive processing steps holds for each processing step up to the N-th processing step PSN that delivers a N-th output digital asset ODAN from one (or more) N-th input digital asset. One of the N-th input digital asset is the (N−1)-th output digital asset, which is a function of the initial digital asset. All or part of the remaining N-th input digital asset may also be a function of the initial digital asset.

For instance, when the initial digital asset is a movie, such processing steps relate e.g. to rescaling, formatting, colorizing, subtitling, adding special effects, etc. The workflow schedules the sequence of processing to be applied on the initial digital asset e.g. by post-production companies.

In some implementations, for each processing step, the workflow defines access conditions to the respective input digital asset and output digital asset. Such access conditions ensure that the respective processing step is authorized and that the respective input digital asset is processed by the authorized processor (e.g. which first server 110a, 110b, 110c and which software is authorized). In practice, such authorization is checked through the comparison of the access conditions with access rights assigned to the first servers 110a, 110b, 110c.

As discussed above, in some embodiments only one processing step has to be applied to the initial digital asset. In such case, no workflow WF200 is needed. In some embodiments, no workflow WF200 is used even if a plurality of processing steps is considered.

Referring now to FIG. 3, we describe the steps of a method for tracking the processing of an initial digital asset according to one embodiment of the present disclosure. Such processing comprises at least one processing step delivering an output digital asset from at least one input digital asset which is a function of the initial digital asset.

More particularly, for at least one given processing step among the at least one processing step, the given processing step delivering a given output digital asset from at least one given input digital asset which is a function of the initial digital asset:

in a step S340, the given output digital asset is watermarked with a watermark, hereafter output watermark, representative of an identifier, hereafter output identifier, of the output digital asset; and in a step S350, metadata, hereafter output metadata, associated to the given output digital asset are created in the blockchain 120. The output metadata are associated to the output identifier.

For instance, the output metadata comprises information about the processing implemented during the given processing step for delivering the given output digital asset from the at least one given input digital asset. Such information comprises e.g. the nature of the processing implemented for achieving the given output digital asset, the person in charge of such processing, the organization in charge of such processing.

Thus, the use of watermarking (according to any known technics) allows uniquely associating an identifier to a considered digital asset which is the result of a processing step. The identifier allows retrieving the metadata securely stored in the blockchain 120, thus allowing the tracking of the processing experienced by the considered digital asset.

Figure 3A:
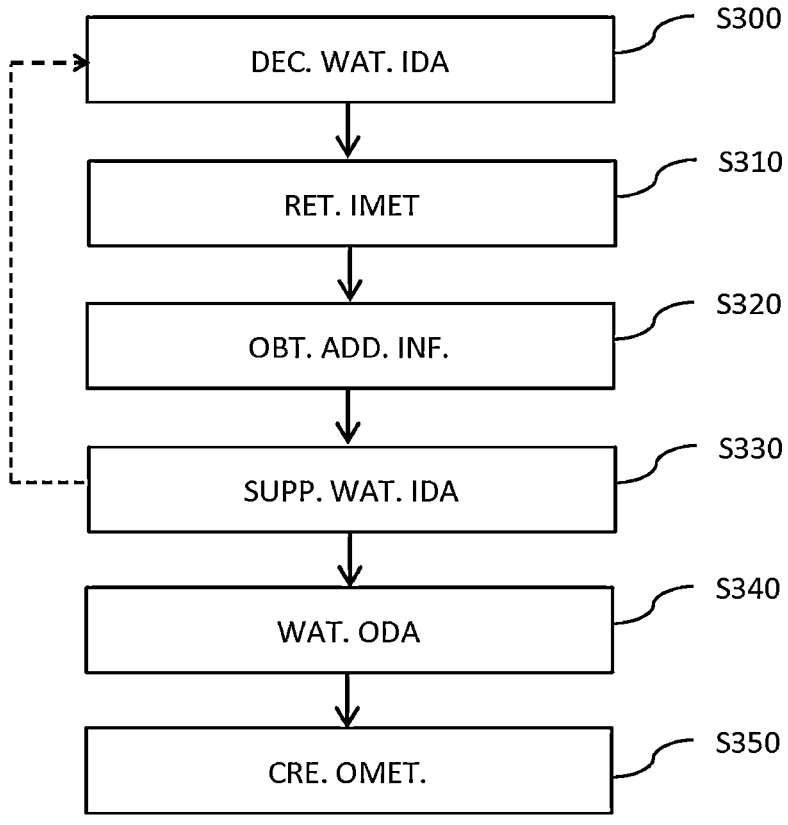
FIG. 3a illustrates the steps of the method for tracking the processing of an initial digital asset according to another embodiment of the present disclosure.

Referring now to FIG. 3a, we describe the steps of a method for tracking the processing of an initial digital asset according to another embodiment of the present disclosure. As discussed above, such processing comprises at least one processing step delivering an output digital asset from at least one input digital asset which is a function of the initial digital asset.

Compared to the embodiment of FIG. 3, the embodiment of FIG. 3a comprises additional steps (steps S300, S310, S320 and S330) that can be combined with the steps S340 and S350 as described above in relation with FIG. 3 (in any of the embodiments described above in relation with FIG. 3). Additional embodiments for the step S350 are also described below.

Back to FIG. 3a, for at least one given processing step among the at least one processing step, the given processing step delivering a given output digital asset from at least one given input digital asset which is a function of the initial digital asset:

in a step S300, a watermark, hereafter input watermark, of the given input digital asset is decoded. The execution of the step S300 delivers an identifier, hereafter input identifier, of the given input digital asset. Metadata, hereafter input metadata, are associated to the input digital asset in the blockchain 120. The input metadata are associated to the input identifier;

in a step S310, the input metadata associated to the input identifier are retrieved from the blockchain 120;

in a step S320, an additional information representative of a right or not to suppress the input watermark is obtained; and, only if the input metadata comprises suppression information allowing the suppression of the input watermark and if the additional information is representative of a right to suppress the input watermark:

in a step S330, the input watermark is suppressed from the given input digital asset delivering an updated input digital asset.

The given processing step delivers the given output digital asset from the updated input digital asset in place of the given input digital asset.

Thus, only the output watermark is present in the given output digital asset. For instance, the suppression information comprises reference to the technic used for creating the input watermark, thus allowing the electronic device 100 obtaining the suppression information to determine a technic to be used for suppressing the input watermark. Alternatively, the suppression information directly comprises reference to the technic to be used for the suppression of the input watermark. In some embodiments, the suppression (or deletion) of the input watermark is carried out before having the given input digital asset being processed for delivering the given output digital asset. In such embodiments, the suppression of the input watermark can be carried out e.g. in a secure environment. It may be an environment dedicated to such suppression. Alternatively, in some embodiments, the suppression of the input watermark is performed when processing the given input digital asset for delivering the given output digital asset. In such embodiments, the suppression (step S330) of the input watermark may be done at the same time as the watermarking (step S340) of the given output digital asset. For instance, the electronic device 100 in charge of executing the steps S330 and S340 is able to recognize from the suppression information what it needs to remove the input watermark.

Furthermore, the right to perform the suppression of the input watermark is controlled through the use of the additional information. In some embodiments, the step S320 comprises populating the additional information into the electronic device 100 executing the conditional act of suppressing the input watermark (step S330). In other embodiments, the step S320 comprises receiving, by the electronic device 100 executing the conditional act of suppressing the input watermark (step S330), the additional information which is sent e.g. by a right management server communicatively connected to the electronic device 100.

However, in some embodiments, the step S320 is not executed and the input watermark is suppressed by the electronic device 100 responsive to the obtaining the suppression information. In other words, in such embodiments, the step S330 is executed only if the input metadata comprises suppression information allowing the suppression of the input watermark.

In some embodiments, the step S310 directed to the retrieving, from the blockchain 120, the input metadata implements an access right management technic (e.g. use of credentials, of a DRM technic, of a certificate, etc.) for allowing the blockchain 120 to provide the input metadata to the electronic device 100 executing the act of retrieving the input metadata (step S310). Thus, the right to retrieve the input metadata is controlled.

In some embodiments, the given processing step delivers the given output digital asset from a plurality of given input digital assets which are a function of the initial digital asset. In all or part of those embodiments, the steps S300, S310, S320 and S330 are executed for each given input digital asset of the plurality of given input digital assets.

In some embodiments, the input metadata comprises information about the processing implemented for obtaining the given input digital asset as a function of the initial digital asset.

In some embodiments, in the step S350, the output metadata created in the blockchain 120 comprises the input identifier. Thus, the metadata associated to a given digital asset allows identifying all or part of the input digital assets used for creating the given digital asset and thus accessing to the corresponding input metadata in the blockchain 120.

In some embodiments, the at least one processing step comprises a plurality of processing steps ordered as a sequence of processing steps delivering each an output digital asset from at least one input digital asset which is a function of the initial digital asset. The output digital asset delivered by a processing step of given rank in the sequence being one of the at least one input digital asset of a processing step of next rank in the sequence. In such case, the steps of the method for tracking the processing of an initial digital asset (in the various embodiments disclosed above in relationship with FIG. 3 and FIG. 3a) are executed for each processing step of the sequence.

In some embodiments, the output and/or input metadata are stored in a respective NFT in the blockchain 120.

Figure 4:
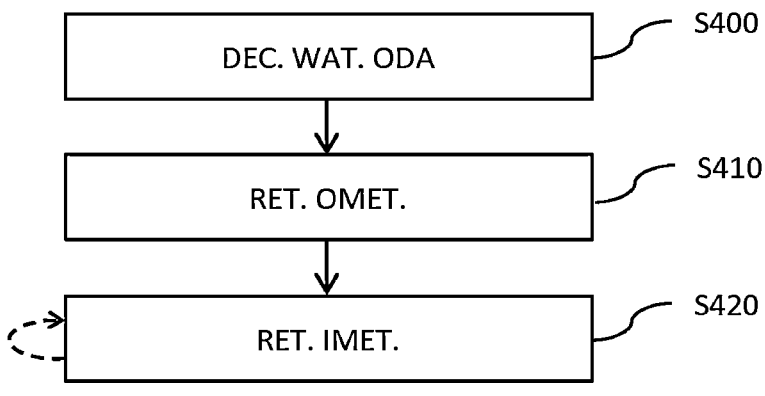
FIG. 4 illustrates the steps of a method for identifying the processing of an initial digital asset according to one embodiment of the present disclosure.

Referring now to FIG. 4, we describe the steps of a method for identifying the processing of an initial digital asset according to one embodiment of the present disclosure. Such processing comprises at least one processing step delivering an output digital asset from at least one input digital asset which is a function of the initial digital asset.

More particularly, for at least one given output digital asset delivered by a given processing step among the at least one processing step, the given processing step delivering the given output digital asset from at least one given input digital asset which is a function of the initial digital asset:

in a step S400, a watermark, hereafter output watermark, of the given output digital asset is decoded. The execution of the step S400 delivers an identifier, hereafter output identifier, of the given output digital asset; and in a step S410, metadata, hereafter output metadata, associated to the given output digital asset is retrieved from the blockchain 120, the output metadata being associated to the output identifier.

Thus, the information relating to the processing implemented for achieving the given output digital asset can easily be retrieved by decoding the watermark of the considered digital asset and retrieving the corresponding metadata from the blockchain 120. For instance, the output metadata comprises information about the processing implemented during the given processing step for delivering the given output digital asset (e.g. the nature of the processing implemented for achieving the given output digital asset, the person in charge of such processing, the organization in charge of such processing).

Back to FIG. 4, the output metadata comprises at least one identifier, hereafter input identifier, of a given input digital asset among the at least one given input digital asset. Input metadata is associated to the given input digital asset in the blockchain 120, the input metadata being associated to the input identifier. In some of those embodiments as in the embodiment of FIG. 4:

in a step S420, the input metadata associated to the input identifier is retrieved from the blockchain 120.

Thus, the electronic device 100 executing the method has the knowledge of the metadata associated to the input digital assets used for achieving a given digital asset.

In some embodiments, the output metadata comprises a plurality of input identifiers. In some of those embodiments, the step S420 is executed for each input identifier of the plurality of input identifiers.

In some embodiments, the step S420 directed to the retrieving, from the blockchain 120, the input metadata implements an access right management technic (e.g. use of credentials, of a DRM technic, of a certificate, etc.) for allowing the blockchain 120 to provide the input metadata to the electronic device 100 executing the act of retrieving the input metadata. Thus, the right to retrieve the input metadata is controlled.

In some embodiments, the input metadata comprises information about the processing implemented for obtaining the given input digital asset as a function of the initial digital asset.

However, in some embodiments, the output metadata does not comprise input identifiers and the step S420 is not executed.

In some embodiments, the output and/or input metadata is stored in a respective NFT in the blockchain 120.

The invention claimed is:

1. A method for tracking processing of an initial digital asset according to at least one processing step delivering an output digital asset from at least one input digital asset that is derived from the initial digital asset, the method comprising, for a given processing step among said at least one processing step, the given processing step generating a given output digital asset from a given input digital asset that is derived from said initial digital asset:

watermarking the given output digital asset with an output watermark that is representative of an output identifier of the given output digital asset; and creating, in a blockchain, output metadata associated with the given output digital asset, the output metadata being associated with the output identifier, wherein the method further comprises, for the given input digital asset, decoding an input watermark of the given input digital asset to obtain an input identifier of the given input digital asset, input metadata being associated with the input digital asset in the blockchain, the input metadata being associated with the input identifier; and retrieving, from the blockchain, the input metadata associated with the input identifier.

2. The method according to claim 1, further comprising, for the given input digital asset:

only if the input metadata comprises suppression information allowing the suppression of the input watermark, suppressing the input watermark from the given input digital asset generating an updated input digital asset, wherein the given processing step generates the given output digital asset from the updated input digital asset in place of the given input digital asset.

3. The method according to claim 2, further comprising:

obtaining additional information representative of a right or an absence of the right to suppress the input watermark, wherein the suppressing of the input watermark is executed only if the input metadata comprises information allowing the suppression of the input watermark and if the additional information is representative of the right to suppress the input watermark.

4. The method according to claim 2, wherein the retrieving from the blockchain, the input metadata further comprises performing an access right management method for allowing the blockchain to provide the input metadata to a device executing the retrieving of the input metadata.

5. The method according to claim 2, wherein the output metadata created in the blockchain comprises the input identifier.

6. The method of claim 1, wherein the creating step further comprises creating the output metadata to include a person or organization in charge of the given processing step.

7. A method for identifying processing of an initial digital asset according to at least one processing step generating an output digital asset from at least one input digital asset, which is derived from the initial digital asset, the method comprising, for a given output digital asset generated by a given processing step among said at least one processing step, the given processing step generating the given output digital asset from a given input digital asset that is derived from said initial digital asset:

decoding an output watermark of the given output digital asset to obtain an output identifier of the given output digital asset; and retrieving, from a blockchain, output metadata associated with the given output digital asset, the output metadata being associated with the output identifier, wherein the output metadata comprises an input identifier of the given input digital asset among the at least one given input digital asset, and input metadata is associated with the given input digital asset in the blockchain, the input metadata being associated with the input identifier.

8. The method according to claim 7, further comprising, for the input identifier, retrieving, from the blockchain, the input metadata associated with the input identifier.

9. The method according to claim 7, wherein the output metadata comprises a plurality of input identifiers, and the method further comprises, for each input identifier of the plurality of input identifiers, retrieving, from the blockchain, the input metadata associated with the input identifier.

10. The method according to claim 2, wherein the input metadata comprises information about the processing implemented to obtain the given input digital asset from the initial digital asset.

11. The method according to claim 1, wherein the output metadata comprises information about the processing implemented during the given processing step to obtain the given output digital asset from the given input digital asset.

12. The method according to claim 1, wherein the output metadata is stored in a respective NFT in the blockchain.

13. A computer program product comprising a non-transitory computer-readable medium storing program code instructions for implementing the method according to claim 1.

14. An electronic device for tracking processing of an initial digital asset according to at least one processing step delivering an output digital asset from an input digital asset that is derived from the initial digital asset, the electronic device comprising:

processing circuitry configured to execute, for a given processing step among said at least one processing step, the given processing step generating a given output digital asset from a given input digital asset that is derived from said initial digital asset:

watermarking the given output digital asset with an output watermark that is representative of an output identifier of the given output digital asset; and creating, in a blockchain, output metadata associated with the given output digital asset, the output metadata being associated with the output identifier, wherein the processing circuitry is further configured to, for the given input digital asset, decode an input watermark of the given input digital
asset to obtain an input identifier of the given input
digital asset, input metadata being associated with
the input digital asset in the blockchain, the input
metadata being associated with the input identifier;
and retrieve, from the blockchain, the input metadata asso-
ciated with the input identifier.

15. An electronic device for identifying processing of an
initial digital asset according to at least one processing step delivering an output digital asset from an input digital asset
that is derived from the initial digital asset, the electronic
device comprising:

processing circuitry configured to execute, for at least one given output digital asset
generated by a given processing step among said at
least one processing step, the given processing step
delivering the given output digital asset from a given
input digital asset that is derived from said initial
digital asset: decode an output watermark of the given output digital
asset to obtain an output identifier of the given output
digital asset; and retrieve, from a blockchain, output metadata associated
with the given output digital asset, the output metadata being associated with the output identifier, wherein the output metadata comprises an input identifier
of the given input digital asset among the at least one
given input digital asset, and input metadata is associated with the given input digital
asset in the blockchain, the input metadata being asso-
ciated with the input identifier.

\* \* \* \* \*